US008842498B2

(12) United States Patent
Cahalan et al.

(10) Patent No.: US 8,842,498 B2
(45) Date of Patent: Sep. 23, 2014

(54) UNDERWATER ACOUSTIC ARRAY, COMMUNICATION AND LOCATION SYSTEM

(75) Inventors: Dennis Cahalan, Longmont, CO (US); Ted Noonan, Louisville, CO (US); Michel Hendricks, Boulder, CO (US); Jeffrey Croghan, Longmont, CO (US)

(73) Assignee: Ceebus Technologies LLC, Boulder, CO (US)

(*) Notice: Subject to any disclaimer, the term of this patent is extended or adjusted under 35 U.S.C. 154(b) by 350 days.

(21) Appl. No.: 13/445,108

(22) Filed: Apr. 12, 2012

(65) Prior Publication Data

US 2013/0272098 A1    Oct. 17, 2013

(51) Int. Cl.
*H04B 13/02*    (2006.01)
*H04B 11/00*    (2006.01)

(52) U.S. Cl.
CPC ............. *H04B 13/02* (2013.01); *H04B 11/00* (2013.01)
USPC .......................................... 367/134; 367/124

(58) Field of Classification Search
CPC ........... G01S 3/14; G01S 3/8022; G01S 3/28; H04B 11/00; H04R 3/00
USPC ........ 367/134, 131, 124, 125; 340/539.1, 850
See application file for complete search history.

(56) References Cited

U.S. PATENT DOCUMENTS

| | | | |
|---|---|---|---|
| 4,787,252 A | 11/1988 | Jacobson et al. | |
| 4,951,263 A | 8/1990 | Shope | |
| 6,125,080 A | 9/2000 | Sonnenschein et al. | |
| 6,130,859 A | 10/2000 | Sonnenschein et al. | |
| 6,272,072 B1 | 8/2001 | Wulich et al. | |
| 7,388,512 B1 | 6/2008 | Moorer, Jr. | |
| 2003/0142587 A1 | 7/2003 | Zeitzew | |
| 2003/0228025 A1 | 12/2003 | Hannah | |
| 2008/0205195 A1 | 8/2008 | Van Der Merwe | |
| 2009/0007694 A1 | 1/2009 | Breeuwer | |
| 2013/0272098 A1* | 10/2013 | Cahalan et al. | 367/134 |

FOREIGN PATENT DOCUMENTS

| WO | 2006040771 A1 | 4/2006 | |
|---|---|---|---|
| WO | WO 2013154862 | * 10/2013 | H04B 13/02 |

OTHER PUBLICATIONS

Kebkal et al.; Experimental Study of a Hydro-Acoustic Hybrid System for Simultaneous Underwater Communication and Positioning; Proceedings of the Twenty-second (2012) International Offshore and Polar Engineering Conference Rhodes, Greece, Jun. 17-22, 2012; pp. 521-526.*
Copenheaver, Blaine R., "International Search Report and Written Opinion re Application No. PCT/US2013/034898", Aug. 26, 2013, p. 12, Published in: US.

* cited by examiner

*Primary Examiner* — Daniel Pihulic
(74) *Attorney, Agent, or Firm* — Neugeboren O'Dowd PC

(57) ABSTRACT

An underwater communication system comprises a plurality of location and messaging units for sending and receiving ultrasonic energy through water. In accordance with one aspect, each of the location and messaging units comprising an array of four ultrasonic transducers positioned such that they define a generally tetrahedral shape, a transceiver adapted to generate a code element, generate a data element, generate a modulation element, and combine the code element, the data element and the modulation element into an analog wave form. The system is further adapted to transmit the analog wave form through each of the four ultrasonic transducers and receive the analog wave-form generated by at least one of the location and messaging units.

21 Claims, 21 Drawing Sheets

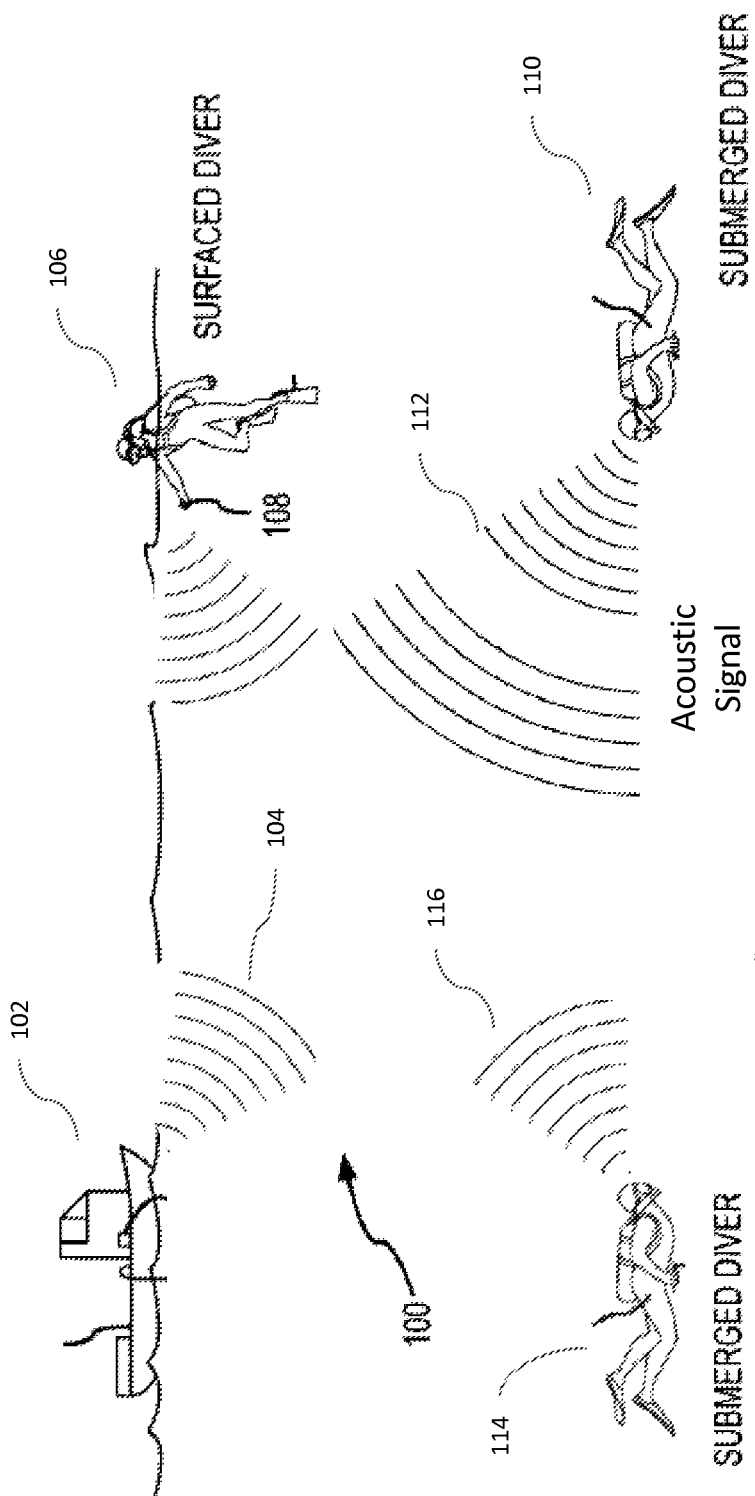

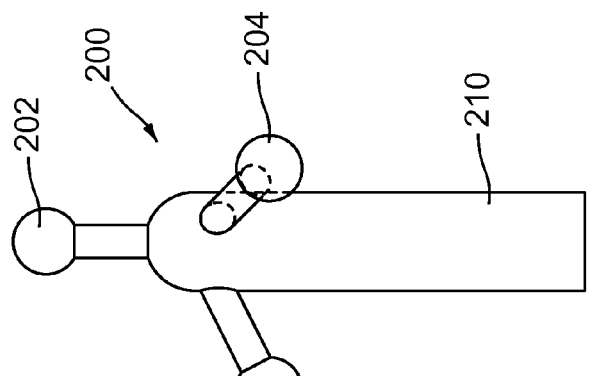
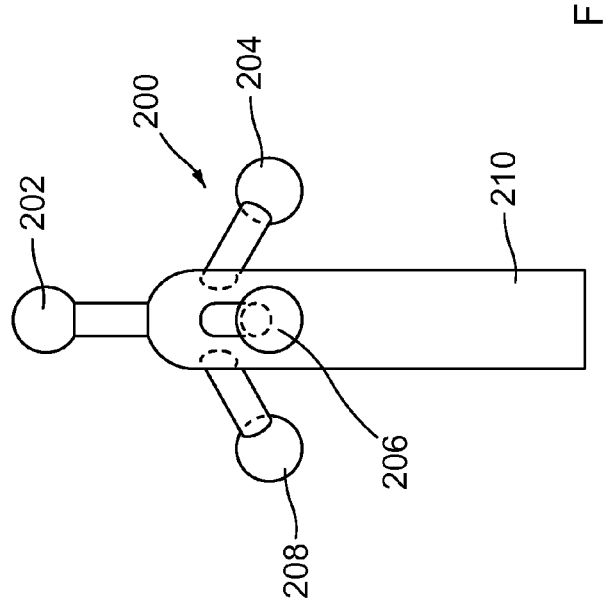
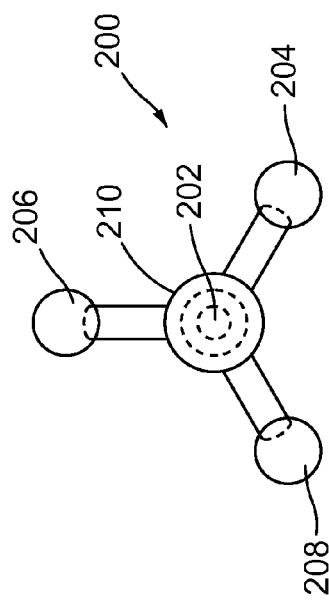
Fig.2A
Fig.2B

Transmit Block Diagram

Receive Block Diagram

Receive Block Diagram
Find/Align Sync – Cross-Correlation Blocks

Receive Block Diagram
Multi-Channel Align Sync
Section

Phase Correction**

Receive Block Diagram
Accumulate Data

**Receive Block
Diagram
Costas Loop Section

Process Data

UNDERWATER ACOUSTIC ARRAY, COMMUNICATION AND LOCATION SYSTEM

GOVERNMENT CONTRACT ACKNOWLEDGEMENT

This material is based upon work supported by the United States Special Operation Command under Contract No. H92222-10-C-0018.

FIELD OF THE INVENTION

Aspects of the present invention relate to locating underwater divers using acoustic signals. In particular, aspects of the present invention relate to the use of acoustic transducers and associated signal processing techniques to transmit and receive signals underwater in order to locate a diver or other object in three dimensions.

BACKGROUND

Scuba diving is a unique and enjoyable recreational experience. It is estimated that, every day, over 75,000 persons participate in the sport at thousands of diving resorts and operations worldwide. In addition, various commercial and military operations utilize scuba divers to perform activities as search and rescue, salvage, underwater construction and repair activities, and military reconnaissance.

Operationally, one aspect of the uniqueness of diving is that underwater communication is extremely limited and communication between divers and the surface is almost nonexistent. Visual interaction between divers is more often than not impossible, particularly when distances between divers increase and when divers are at different depths. Divers within a few feet of each other, but at different depth planes, may not have any visibility of the other diver. While the diving industry has developed several techniques to facilitate underwater communication (e.g. hand signals, writing on a slate, tapping on one's tank, and some electronic communication devices), most of them require close proximity for the communicating divers and, in the case of electronic means, are prohibitively expensive for all but commercial divers and military operations.

Limited underwater visibility exacerbates communication difficulty. The best recreational ocean diving sites around the world may have 150-200 feet of underwater visibility. Most have 60 feet or less of visibility. With few exceptions, visibility at inland sites such as lakes, rivers and quarries drops below 20 feet. Considering that ocean currents in many dive areas may have a velocity of one to two knots, a diver in perfect visibility conditions can drift out of sight in less than 60 seconds.

Visibility is further reduced by underwater topography which may include coral or rock formations. Night-diving conditions obviously limits communication even further and complicates the divemaster's supervisory responsibilities.

Major scuba-diving-certifying organizations have attempted to mitigate these risks by establishing well-accepted rules: always dive with and stay close to a "buddy"; evaluate conditions carefully and seek orientation with a local dive shop before diving; plan the dive carefully, follow the plan once underwater, surface when one becomes separated from the group; etc. The fact remains, though, that the communication options available to the average recreational diver when in distress or when separated from the group are extremely limited. In contrast with many land-based activities divers do not have the option of carrying emergency rescue beacons or other long-range communication options. At best, some recreational divers carry only a simple whistle or inflatable tube for use at the surface.

Simple and unsophisticated antenna-based location systems have been developed in the past, such as those found in U.S. Pat. No. 7,388,512, but fail to provide reliable and accurate directional and distance location information that is useful in the low-visibility environments described above.

Furthermore, underwater communication presents complicated problems due to the tendency of electromagnetic and ultrasonic waves to attenuate or otherwise deteriorate when travelling or propagating underwater. The need for location information as well as the need to communicate text based messages provides another hurdle that cannot easily be solved with known underwater communication systems. Finally, the need to add security or otherwise covert communication features to these devices adds yet another level of complication for acoustic-based communication systems.

SUMMARY OF THE INVENTION

In one embodiment, an underwater communication and location device comprises an array of at least four omnidirectional or isotropic ultrasonic transducers, the ultrasonic transducers positioned such that all of the transducers are not contained within a common plane, a transmitter adapted to generate a pseudo-random code element, generate a data element, generate a modulation element, combine the pseudo-random code element, the data element and the modulation element into an analog waveform, and transmit the analog waveform through each of the four ultrasonic transducers.

In another embodiment, a communication system comprises a transmitter, a receiver, and a processor adapted to receive incoming data, generate a plurality of cross-correlation data, pass the cross-correlation data into a block delay calculator, calculate the average phase delay between the plurality of cross-correlation data, generate an array of rotational vectors, and correct for delays present in the cross-correlation data.

In another embodiment a communication system comprises a transmitter, a receiver, and a processor adapted to, align a target synchronization pattern with incoming data by cross-correlating segments of incoming data with corresponding segments of a target synchronization pattern to form block cross-correlation data, passing the block cross-correlation data into a block delay compensation process wherein the block cross-correlations are corrected for time-delay differences and are combined to form a delay-compensated cross-correlation, and use the delay-compensated cross-correlation data to locate the target synchronization data within the incoming data.

In another embodiment, an underwater communication system, comprises a plurality of location and messaging units for sending and receiving ultrasonic energy through water, each of the location and messaging units comprising an array of four ultrasonic transducers positioned such that they define a generally tetrahedral shape, a transceiver adapted to, generate a code element, generate a data element, generate a modulation element, combine the code element, the data element and the modulation element into an analog wave form, transmit the analog wave form through each of the four ultrasonic transducers, and receive the analog wave form generated by at least one of the location and messaging units.

Other embodiments will become known to one of skill in art after reading the following specification in conjunction with the figures and claims.

BRIEF DESCRIPTION OF THE DRAWINGS

FIG. 1 is a schematic overview of a typical diving scenario;

FIGS. 2A and 2B are of a form used for casting a negative-image form that is used to accurately position the transducers at their proper locations prior to encapsulation used in accordance with aspects of the present invention;

DETAILED DESCRIPTION

Figure 3:
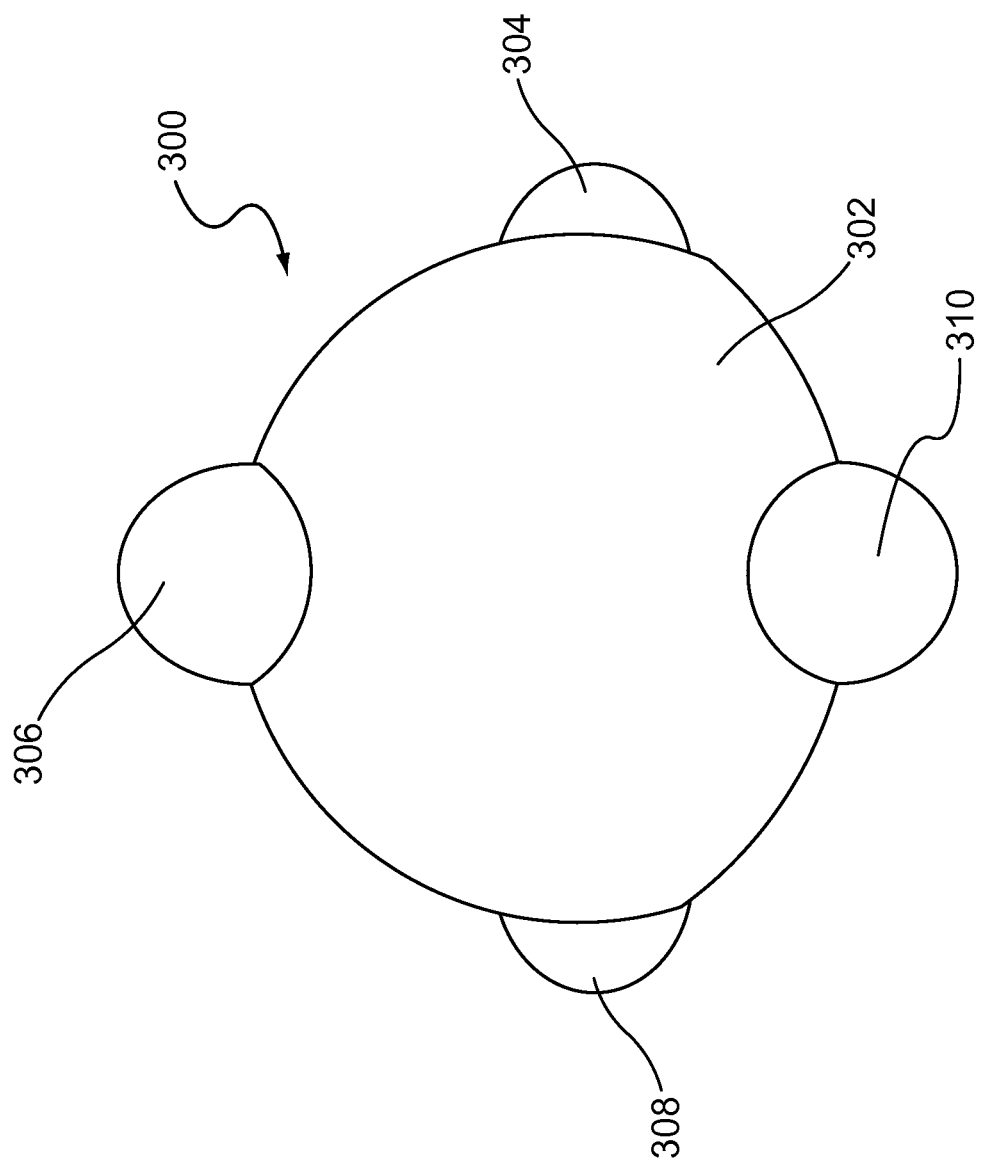
FIG. 3 shows a transducer array prior to encapsulation used in accordance with aspects of the present invention.

With reference to FIG. 1, a generalized schematic overview 100 is shown of an underwater diving scenario involving two or more divers (three in the example of FIG. 3) and a surface vessel. In the diving scenario of FIG. 1, each of the surface vessel 102, the surfaced diver 106, and each of the submerged divers 110 and 114 carry or are otherwise equipped with a device that can both generate and receive an acoustic signal, such as an array of acoustic transducers. While not shown in FIG. 1, each of the acoustic transducer arrays produces and receives an omni-directional acoustic signal. In FIG. 1, surface vessel 102 produces signal 104, surfaced diver 106 produces signal 108 and submerged divers 110 and 114 produce signals 112 and 116 respectively. As will be described in greater detail below, each of the signal devices such as the acoustic transducer array described above, are adapted to both generate and receive an acoustic signal and coincidentally determine the location of the device that generated that signal, both in terms of angular position and linear distance.

Transducer Array

With reference to FIGS. 2A, 2B and 3, an array 300, in this example, consists of spherical piezo transducers 304, 306, 308 and 310 held in a tetrahedral array configuration by an inner array structure 302. The inner array structure 302 is generated in a casting process as a negative-image form by using the tree-like structure 200, found in FIGS. 2A and 2B. The locations of the piezo transducers 304, 306, 308 and 310 are defined by the positions of the balls 202, 204, 206 and 208 on the ends of the tree-like structure 200, therefore it is important that the balls 202, 204, 206 and 208 are accurately positioned. While in practice and operation the transducer array, 300, containing the actual piezo transducers 304, 306, 308 and 310, is encapsulated in a protective material, FIGS. 2A and 2B provide details about the geometric orientation of the plurality of individual transducers that comprise the array 300. As shown in FIGS. 2A, 2B and 3, transducers 304, 306, 308 and 310, whose locations are defined by the balls 202, 204, 206 and 208 are arranged in a generally tetrahedral configuration and are maintained in this configuration though the use of a support structure 210. While specific dimensional data is provided with the example in FIGS. 2A and 2B, it should be understood that the nominal dimensions between the individual transducers may range in various embodiments, where a minimum of four non-coplanar transducers are required for purposes of locating another similarly equipped diver or vehicle in three dimensional space, resulting in a unique geometric solution for said diver or vehicle. The dimensioning shown in FIGS. 2A and 2B is relative and can be applied to any scale, as long as the relative distances between the individual transducers remains in alignment with the shown dimensions. However, these relative dimensions are only one embodiment. For example, while FIG. 2B shows a 120° angle between the transducers and where the transducers are all located the same distance from the center of the array, in other embodiments, that distance from the center may range from less than a centimeter to over a meter, depending on the frequencies that are used for communication. Other embodiments may include other non-tetrahedral configurations, as long as there are a minimum of four transducers that are not all contained within the same plane. Additional transducers, exceeding four, may be used, and may offer signal processing benefits over just four transducers.

Figure 4A:
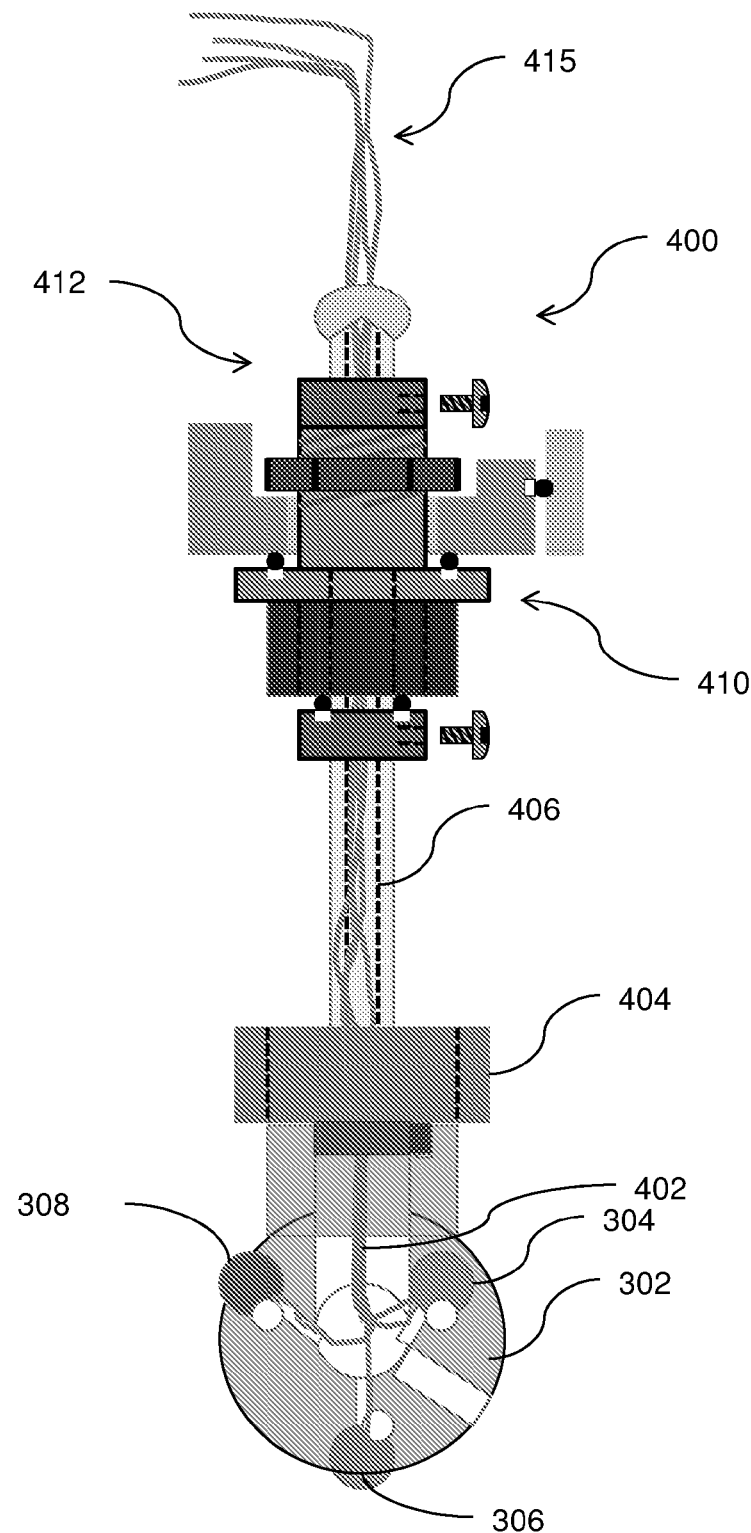
FIGS. 4A and 4B show a cross section of an encapsulated transducer array used in accordance with aspects of the present invention.
Figure 4B:
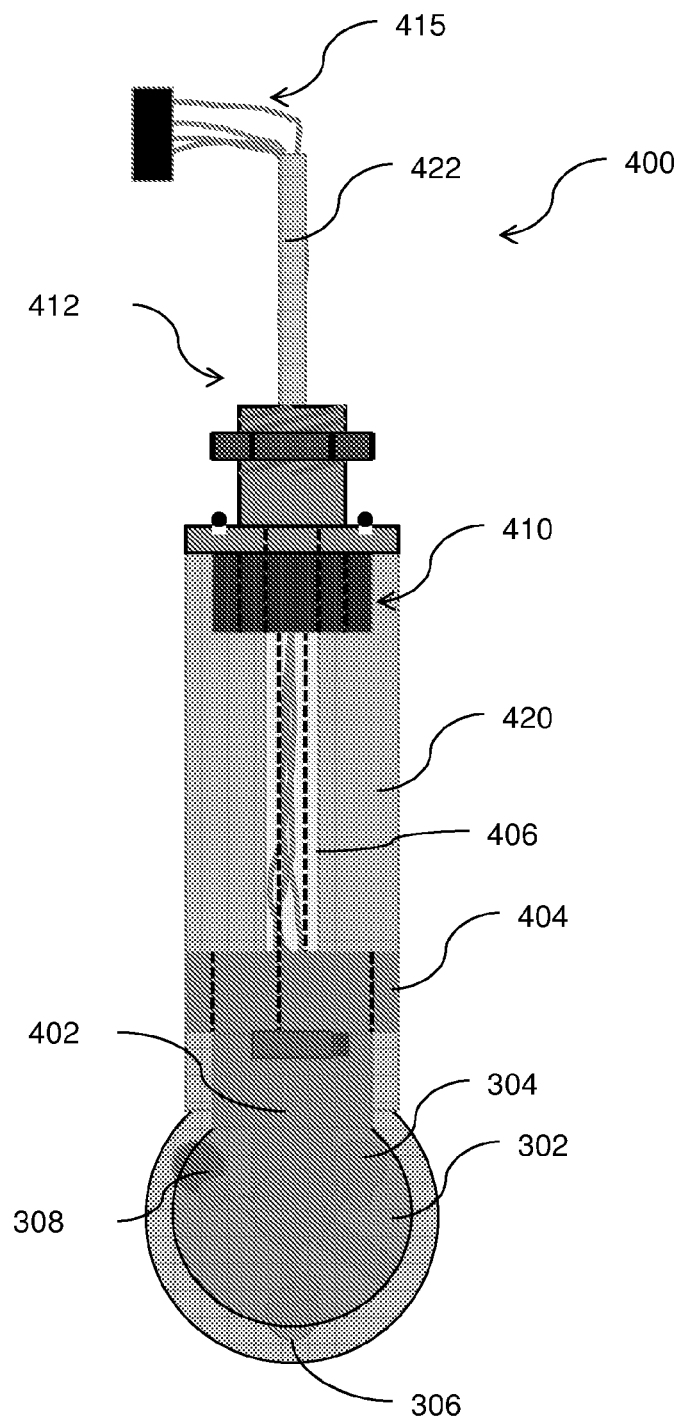

With reference to FIG. 3, an encapsulated transducer array 300 is shown that includes the four transducers 304, 306, 308, and 310 held in geometric orientation by a pliable but sturdy inner-array form 302 preferably made out of an acoustically neutral material such as Rho-C. Rho-C is a polymeric material with acoustic properties that very closely mimic those of water. The formed transducer array 300 is then encapsulated and incorporated into a more complete form with a housing that contains electronics and cabling for use in connection with an operational device. FIGS. 4A and 4B show one embodiment of a completed transducer array as an assembly 400 that can be connected to the associated electronics and control mechanisms described below. Transducers 304, 306 and 308 (transducer 310 is hidden in the view of FIG. 4A) are connected via conductors 402 through a channel 406, mechanical mounting assemblies 410 and 412 where they emerge in a conductor cluster 415. The completed assembly may be mounted or otherwise engaged on a dive computer, board or other mechanism that is ported by an underwater diver. In one embodiment, conductor assembly 415 is coupled to an electronics package that performs one or more of the functions described in conjunction with FIGS. 6-15 below.

Transducer Communications Channel

While the individual transducers integrated into the transducer array are important for transmitting outgoing signals and capturing the incoming signals from the source diver or other transmitter, the outgoing data needs to be processed into a form ready for transmission, and the incoming data needs to be decoded and translated into information that indicates the distance and vector of the source as well as to identify the source (e.g. a particular diver from among several on a dive or underwater mission). Described below are various embodiments of a communications channel and associated software and algorithms that may be utilized to package the data for transmission and to interpret the data coming from the transducers.

Transmit Algorithm

Figure 6A:
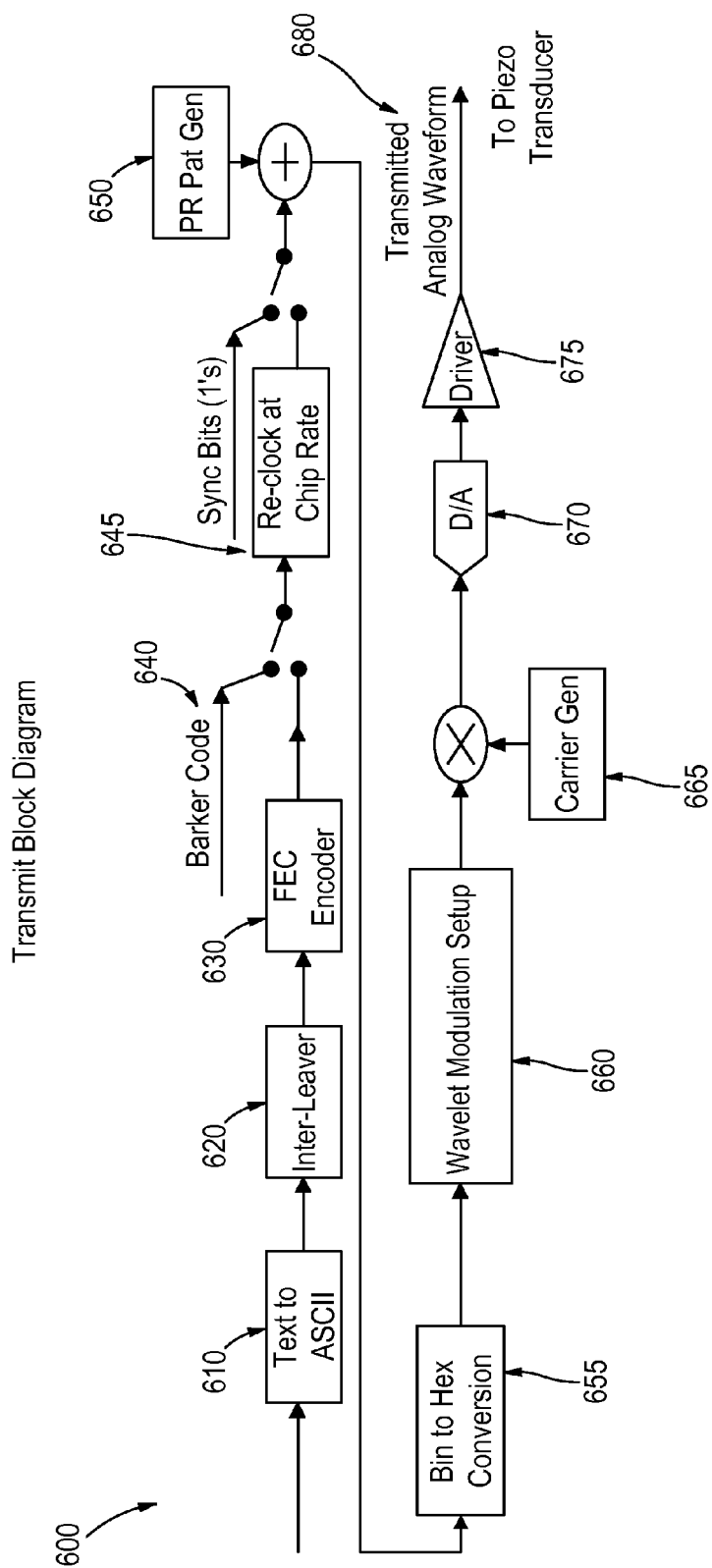
FIG. 6A shows a transmitter block diagram used in connection with aspects of the present invention.

With reference to FIG. 6A, a high-level block diagram of a transmit function 600 is shown. The transmit function 600 represents the first step in a communications channel protocol implemented by a diver location system constructed in accordance with aspects of the present invention and begins the process of identifying a particular diver and establishing a communications link for both messaging and location identification. At 610 an ASCII text is interleaved at 620 in order to distribute burst errors over the entire transmission, and thereby turn them into shorter errors that are correctable by a forward error correcting code encoder 630. Barker code 640 is pre-pended to the data, then sync data is pre-pended to this array of data in the form of a stream of 1's (or 0's), after which the full array of data is combined with (mixed or added with) a pseudo random pattern generated at 650. The resulting pseudo-random data is translated into hexadecimal format at 655 in order to choose the appropriate modulated wavelet at 660 for a given pseudo-random data hexadecimal symbol value.

Establishing the pseudo-random communication code 650 is a function that is performed during an initialization procedure where communication codes are established in the form of a lookup table. The wavelet modulation setup block 660, also performed during initialization, develops 16 modulation wavelets, one for each symbol type that can be transmitted. In this embodiment, these wavelets are quantized and scaled to provide four transmit amplitude ranges that vary by factors of 2× in voltage (4× for power) to be selected as needed to either conserve power or increase the transmit distance, using the Read-Only Memory (ROM) tables described below.

Figure 6B:
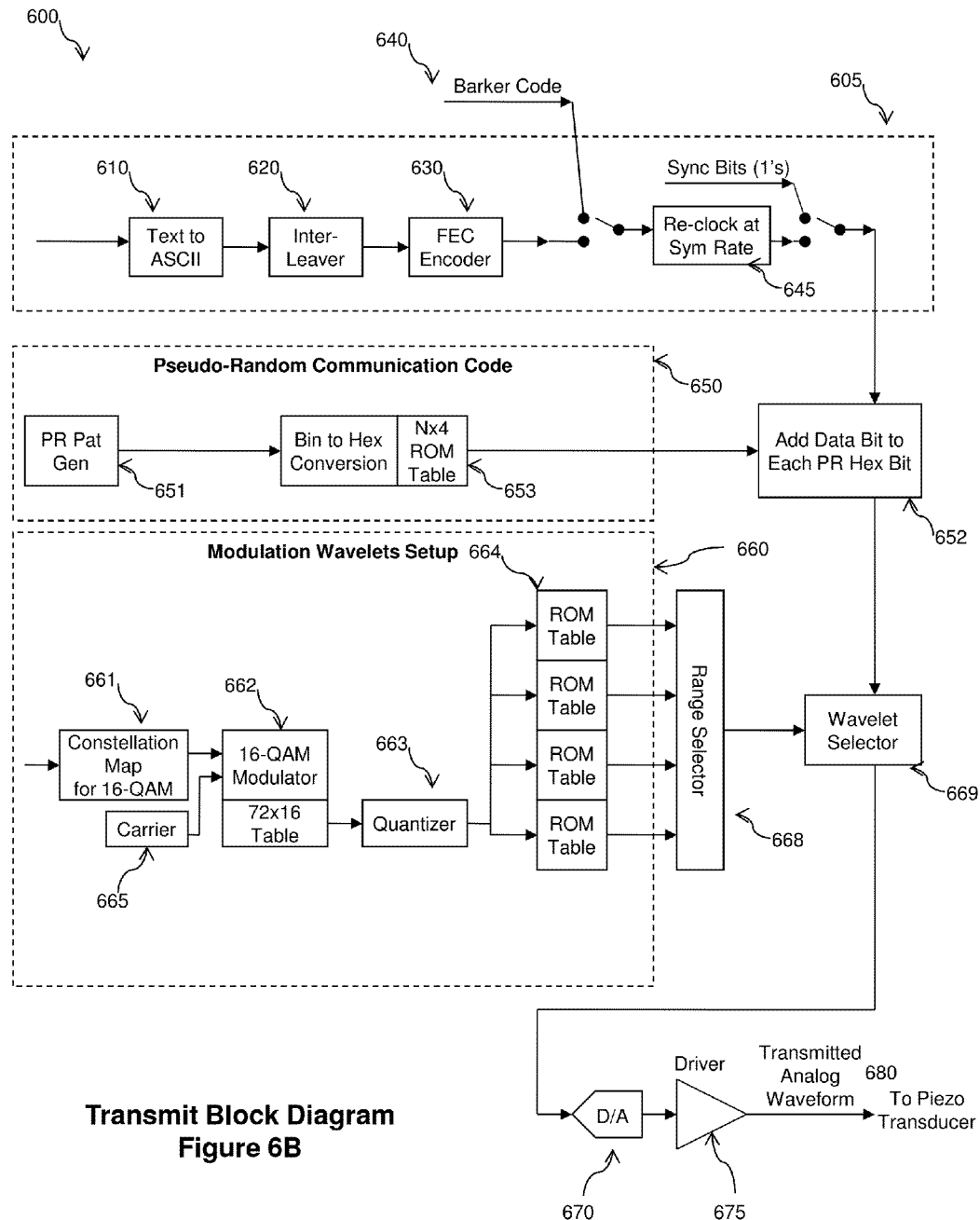
FIG. 6B shows a detailed transmitter block diagram used in connection with aspects of the present invention.

FIG. 6B shows a more detailed version of the transmit block diagram 600 initially shown in FIG. 6A, expanding on the details of the pseudo-random communication code 650 and the modulation wavelet setup function 660. However, in general, like references from FIGS. 6A and 6B describe similar elements within the overall transmit function 600. Pseudo-random communication code 650 further includes a pattern generator 651 and a hex convertor coupled with a memory table 653. In one embodiment, pseudo-random communication code 650 generates a preset pattern for all users of the system to communicate to/with. Output of the pseudo-random communication code 650 is added to the data code coming from the data transmit function 605. In one embodiment, a data bit is added to each pseudo-random hex bit coming from the pseudo-random communications code 650.

Figure 5:
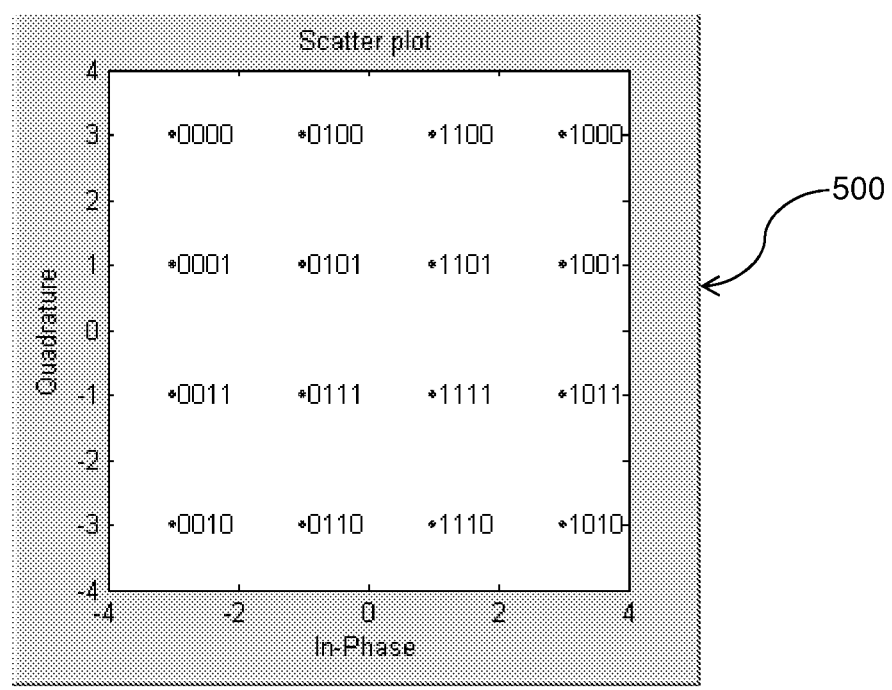
FIG. 5 shows a constellation map of a modulation scheme used in a communication channel example as used in connection with aspects of the present invention.

The modulation wavelet setup block 660 is used to preconstruct modulated wavelets, where in this embodiment constitute a form of 16-Quadrature Amplitude Modulation (16-QAM), according to the constellation map of complex in-phase and quadrature components in FIG. 5, showing how each hexadecimal value is modulated, in terms of amplitude and phase. The wavelet selector 669 is used to select modulated wavelets based on the values of the hex-formatted pseudo-random data 652. The modulated pseudo-random data now goes into a digital-to-analog converter 670 and then transmit driver 675 before being passed to the transmit piezo transducer at 680.

Modulator block 660 includes a constellation map 661, carrier 665, modulator 662, quantizer 663 and a series of ROM tables 664, one for each transmit amplitude for an embodiment where various amplitudes are used, mostly in the interest of conserving power while only transmitting short distances. In one embodiment, modulator block 660 constructs different wavelets (16 in this example according to the matrix shown in FIG. 5) that each represents a potential wavelet signal for transmitting by the piezo transducer. In describing aspects of this invention, four communication channels are used as an example, but it is contemplated that the scope of the invention can be expanded for other numbers of communication channels.

Range selector 668 takes the output of the modulation wavelet setup block (for the desired transmit amplitude) and feeds that data to a wavelet selector 669. Wavelet selector 669 uses information comprising the added pseudo-random code hex bit and data bit from 652 for selecting the appropriate modulation wavelet from 668 and the resulting information is passed through a digital to analog converter 670, then through a driver 675 and on to one or more piezo transducers at 680 as a transmitted analog waveform.

With continuing attention to the transmit block diagram 600 shown in FIG. 6B, an example of the data interleaving is described. For example, a text message sent to a diver such as "jump in" is converted to hexadecimal ASCII format at 610 and is then interleaved, bit by bit at 620. Interleaving mixes up the data to provide robustness against large acoustical spikes that might otherwise overwhelm the data recovery channel. Once the data is interleaved, a forward error correcting code (FEC) is added at 630. In one example, the FEC routine creates a 1 bit delay shift register of the data and a 2 bit delay shift register. From the three streams of bits (including undelayed), two XOR arrays are created. XOR1 performs an exclusive-or operation on the undelayed data array, the 1 bit delay and the 2-bit delay, resulting in the XOR1 array. The XOR2 is produced by an exclusive-or of the undelayed data array and the 2-bit delay array. The two XOR arrays are then interleaved, bit by bit, to produce the FEC encoded data coming out of 630.

The Barker code is added at 640, then the sampling rate for the Barker and FEC data is increased by a factor of 4 in this case (where a "0" translates to "0000" and "1" translates to "1111"). The sync data is pre-pended to this array in the form of a stream of 1's (or 0's), and now the entire data stream is ready to be combined with (modulo-2 added or mixed with) the pseudo-random number (PRN) from 650. Data from 605 is stepped through one bit at a time, and the pseudo-random pattern (PRN) one nibble (4 bits) at a time. If the data bit is 0, the next nibble of the PRN is added to the output array. If the data bit is 1, the next nibble of the PRN is inverted and it is added to the output. In this example the PRN is mixed with the data stream.

In this embodiment, the final step of this process which produces data that can then be transmitted is to step through the data array, nibble by nibble, and to use these hex values to index an array of mod-wavelets (containing segments of modulated waveforms). The mod-wavelet array is in one example 16 columns by 72 rows of samples, so for every nibble (or hex value) one of 16 columns is selected. So the algorithm takes a nibble of data at a time and writes the 72 sample values corresponding to the nibble column. This process of compiling a collection of mod-wavelets is continued for the entire length of data transmitted.

Receive Algorithm—Overview

Figure 7:
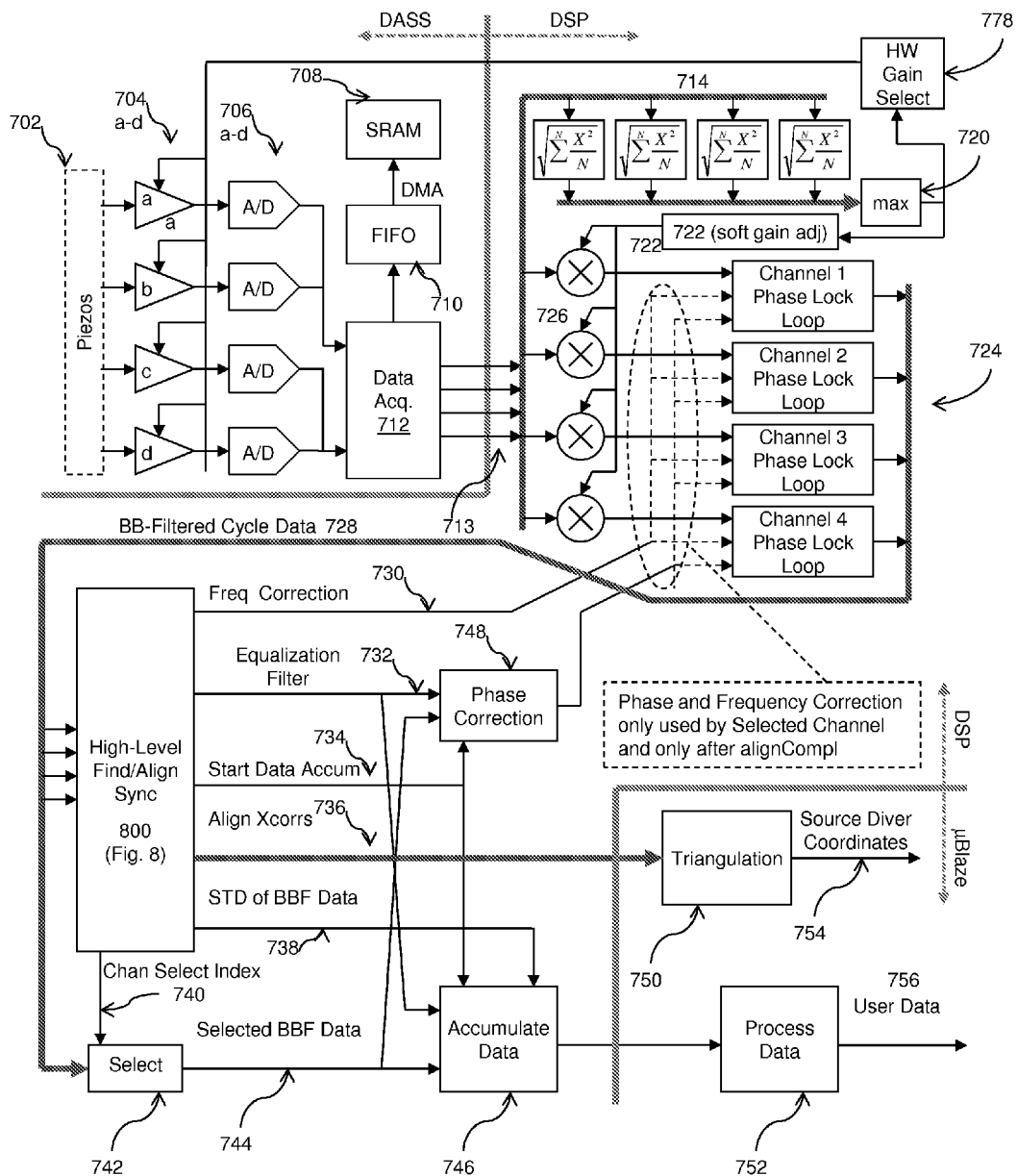
FIG. 7 shows a receiver block diagram used in connection with aspects of the present invention.

With reference to FIG. 7 a receive block diagram 700 is shown that illustrates an embodiment of how four-channels of piezo transducers interpret source diver coordinates 754 and receive user data 756 from another diver or location system. Piezo array 702 comprises four separate piezo transducers and thus generates a four-channel signal represented by communication channels 704 a-d. DASS, DSP and micro-Blaze (or another soft core processor) portions of the receive function are separated in FIG. 7 but can all be implemented in a single board, FPGA or functioning ASIC processor. Analog-to-digital converters 706 a-d pass the received four channel signal to a data acquisition module 712. SRAM 708 and FIFO unit 710 comprise a diagnostics unit for analyzing communications channel data coming from the piezo array 702. Communication channels exit the data acquisition module 712 at 713 and are processed by multipliers 726, root mean squared calculation module 714, a hardware gain select module 778 and output to a four channel phase lock loop 724, such as a Costas loop. Also present in the hardware is a module 720 for selecting the maximum RMS value from 714 which is then passed to a module 722 for calculating the soft gain adjustment that is looped back to the multipliers 726, in order to maintain a fairly constant signal amplitude. Output from the phase-lock loop 724 (detailed in FIG. 15) is demodulated and filtered data, also called base-band filtered data, or BB-filtered cycle data 728, which is then sent to the find/align sync module 800 (See FIG. 8).

From the find/align sync module 800, frequency correction data 730 is fed back to phase lock loop 724 as needed. A signal indicating that start of data was found, start data accum 734, is used to start processes in the phase correction block 748 (detailed in FIG. 13) and the accumulate data block 746 (detailed in FIG. 14). Equalization filter values 732 is also passed to both the phase correction block 748 and the accumulate data block 734. From find/align sync module 800, the number corresponding to the selected primary channel used for data recovery (channel select index) 740 is passed to selector 742 for the purpose of selecting that channel of BBF data 744 (the one with the best signal) to be passed to phase correction block 748 and data accumulator 746. The standard deviation (or RMS value) of BBF data 738 is used for proper data scaling within the accumulate data process 746. The find/align sync module 800 passes the align-sync cross-correlations 736 to the triangulation block 750 to calculate the source diver coordinates 754. Text Messaging Data is processed at 752 from data collection module 746 before being sent out as user text data 756. The messaging component of the communication channel shown as "User data" is based on data collection from just one of the four channels shown in the example of FIG. 8. Data accumulator 746 uses the messaging data (selected BBF data 744) from that data stream.

Costas Loop

Figure 15:
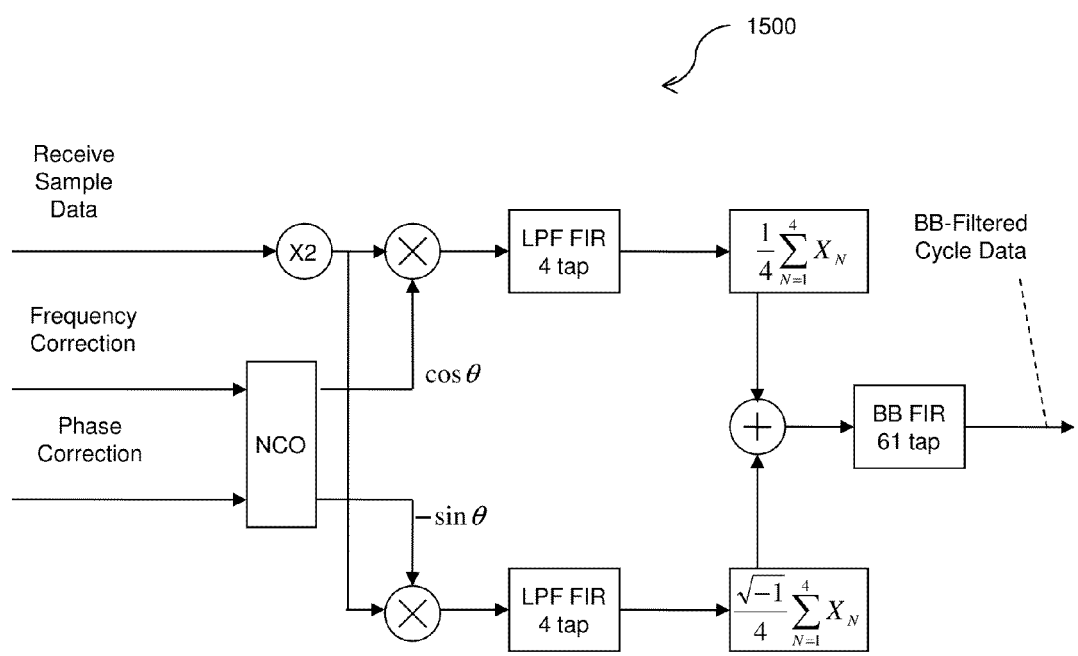
FIG. 15 shows a Costas loop block diagram used in connection with aspects of the present invention.

Once data has been properly gain adjusted, at the outputs of the multipliers 726, it is ready to be phase-locked and demodulated. With reference to FIG. 15, the Phase-Lock Loop/Demodulator (in the form of a Costas Loop) 1500 is shown in more detail. The upper portion of the loop demodulates the inphase (real) component of raw receive data. The lower portion of the loop demodulates the quadrature (imaginary) component of raw receive data. Each component is multiplied by either a cosine or a sine function that comes from a numerically-controlled oscillator (NCO), which is basically a process consisting of cosine and sine functions that have phase and frequency parameters incorporated in them. The data is then low-pass filtered to preserve only the demodulated waveform, after which consecutive groups of four samples each (that make up a carrier cycle for this embodiment) are averaged resulting in a stream of complex data, now running at approximately the carrier cycle rate, one value per cycle. This complex data is then base-band filtered to improve symmetry and to reject noise, where the result is referred to as BB-filtered cycle data 728; these are complex values where both magnitude and phase are still preserved. This data is used extensively throughout find sync, align sync and data recovery. After sync has been found and aligned, frequency correction and the initial phase correction to the carrier is adjusted according to phase and frequency errors measured and averaged over the recovered Barker code data. After Barker code data, continual phase corrections are made based on incoming user data.

Find/Align Sync—Overview

Figure 8:
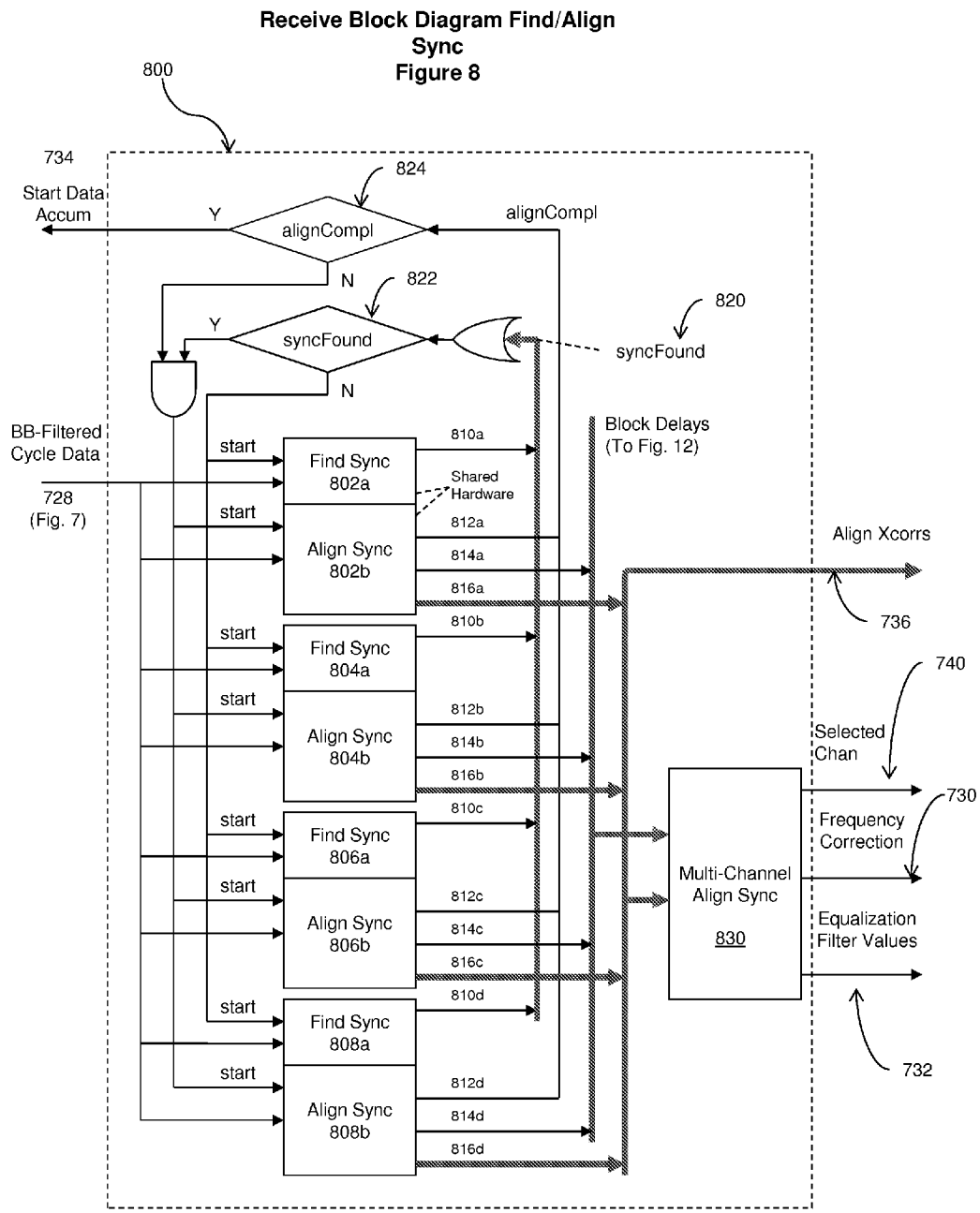
FIG. 8 shows a find/align sync block diagram used in connection with aspects of the present invention.

With reference to FIG. 8, the find/align sync 800 block diagram is shown in more detail. Find/align sync is one component in the receive functionality of the present embodiment. Various components from find/align sync module 800 that pass back to or are incoming from receive module 700 are shown within FIG. 8, such as start data accumulator 734, BB-Filtered cycle data 728, align-sync cross-correlations 736, channel selector 740, frequency corrector 730, and equalization filter 732.

Within find/align sync module 800, the four communication channels of BB-filtered cycle data 728 enter from 724 into a series of four find sync/align sync modules shown as 802, 804, 806 and 808. Each of the modules 802-808 include a channel find block ('a' in each block) and a channel align block ('b' in each block) working in concert with each other to calculate and output four functions that enable a sync patterns to be found and aligned. Outputs from each of the find sync/align sync blocks include a sync found signal 810a-810d, an align complete signal 812a-812d, a block delay value 814a-814d, and align sync cross correlations 816a-816d. Each of the sync found signals are passed to a sync found logic element 822. Each of the align complete signals are passed to an align complete logic element 824. If sync pattern is found at 822, the resulting signal is passed through the align sync blocks until sync alignment is complete at 824. If sync is not found at 822 (find sync), the process is repeated until sync is found. Similarly, if align is complete at 824 (after sync was found), the resulting align sync cross-correlation waveforms 736 are passed to the triangulation section 750 to determine where the source diver is located. The align sync cross-correlation waveforms 736 are also used in Multi-Channel Align Sync 830 to identify the primary channel used for text data recovery and to properly align that data. Data read from the align/sync modules 802-808 are also fed to a multi-channel align sync 830 which exports signals such as selected channel number 740, frequency correction 730 and equalization filter values 732. Align sync cross-correlations 736 is also output from the align sync block in order to triangulate the source diver location at 750 (FIG. 7).

Find Sync Algorithms

Figure 9:
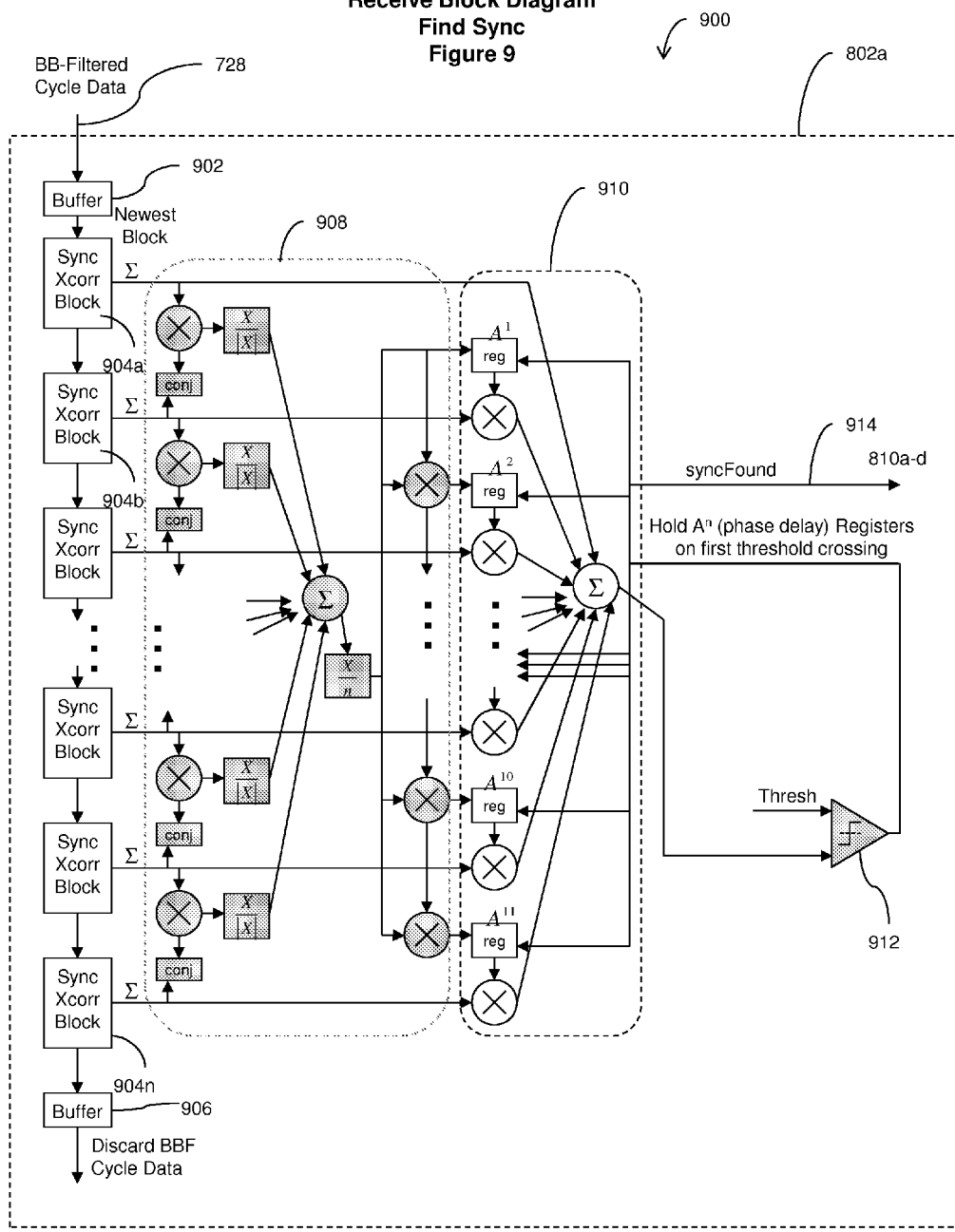
FIG. 9 shows a find sync block diagram used in connection with aspects of the present invention.

With reference to FIG. 9, a detailed embodiment of a find-sync process 900 is shown. As represented in FIG. 9, the functions within dashed-line labeled 802a correspond to any of find sync blocks 802a-808a shown previously in FIG. 8. BB-filtered cycle data (base-band filtered data) is received from 728 into a buffer 902. One or more sync cross-correlation blocks 904a-904n pass block cross-correlation data (the result of cross-correlating a segment of the complex target sync pattern with a segment of incoming complex base-band filtered data 728, as detailed in FIG. 11) into the block delay calculation section 908. As shown in 908, functions such as multipliers, normalizers, summation and conjugation are operated upon the complex block cross-correlations from 904a-904n to calculate the average phase delay between adjacent block cross-correlations (also called the average block delay). This average block delay is used to generate an array of complex unity-length rotational vectors (A^1 through A^11) that are multiplied with each of the block cross-correlations 904a-904n within the block delay compensation section 910 to individually correct for the delays inherent in each of the block cross-correlations 904a-904n, due to Doppler shift and other sources of frequency offset. From the delay compensation process 910, sync found signal 914 is eventually generated, as shown in FIGS. 8 and 9 as 810a-810d, if and when the magnitude of the summed cross-correlations exceed a predefined threshold (shown as an input to a comparator 912).

Align Sync Algorithms

Figure 10:
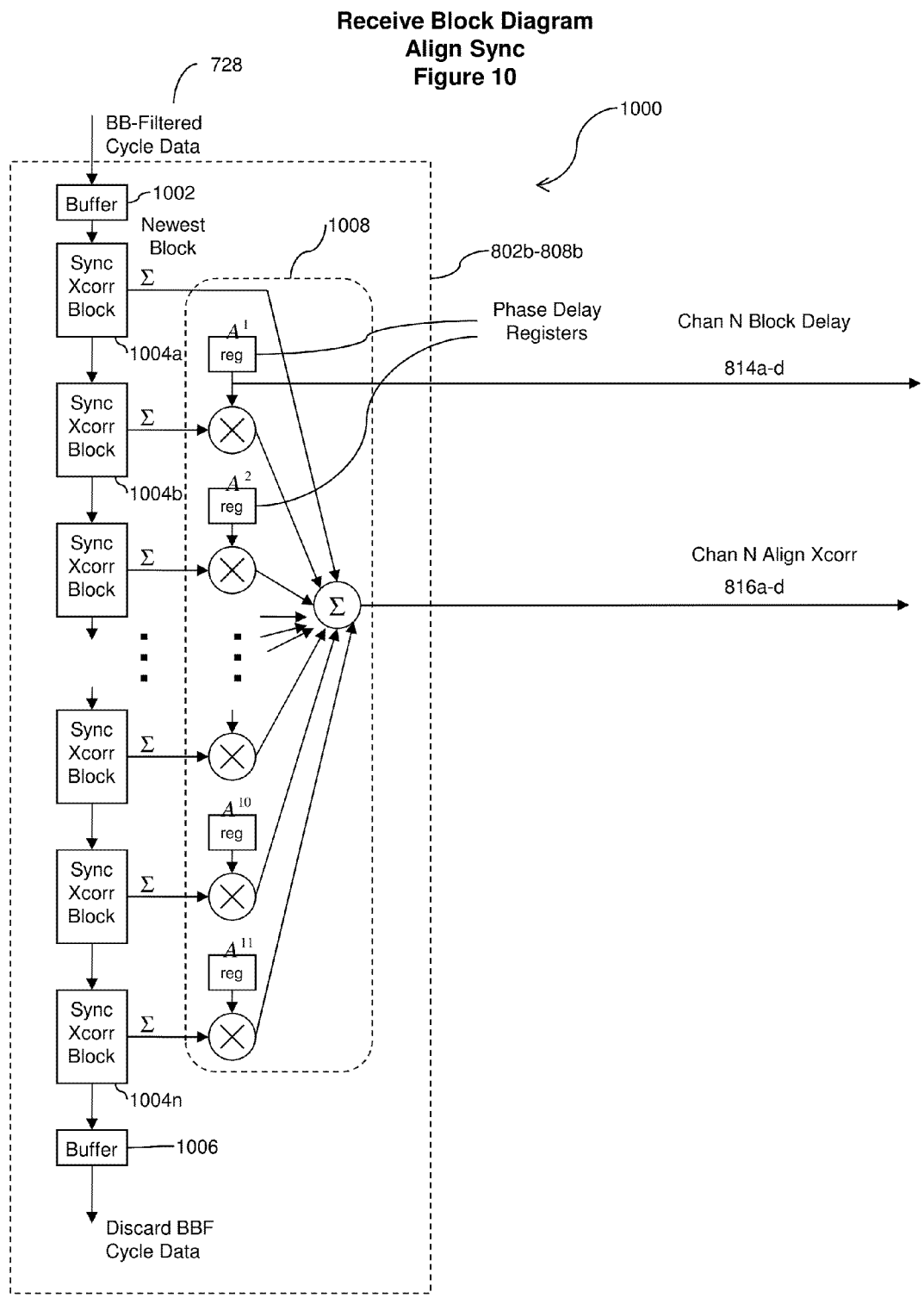
FIG. 10 shows an align sync block diagram used in connection with aspects of the present invention.

With reference to FIG. 10, a detailed embodiment of an align-sync process 1000 is shown. Align sync is a simplified version of find sync that accurately aligns the sync pattern with the complex BB-filtered cycle data 728. As represented in FIG. 10, the functions within the dashed-line labeled as 802b-808b correspond to any of align sync blocks 802b-808b shown previously in FIG. 8. BB-filtered cycle data is received from 724 into a buffer 1002. One or more sync cross-correlation blocks 1004a-1004n pass the complex block cross-correlation data into the block delay compensation process 1008. As shown in 1008, complex functions such as multipliers, normalizers and summation are used to process the data, where the complex rotational vectors (A^1 through A^11) generated earlier during find sync 900 are multiplied with each of the block cross-correlations 1004a-1004n within the block delay compensation section 1008 to individually correct for the delays inherent in each of the complex block cross-correlations 1004a-1004n, due to Doppler shift and other sources of frequency offset. At this point the individually compensated block cross-correlations can be summed and yield outputs 816a-d. These align sync processes are repeated with each single-step shift of BB-filtered cycle data (rather than the more coarse shifting used to just find sync) in the vicinity of where sync was found. Having this high-resolution cross-correlation data allows for the incoming data to be accurately aligned for data recovery, and provides the cross-correlation waveforms needed for triangulation of the source diver location. From delay compensation process 1008, block delays 814a-814d and the complex align sync delay-compensated cross-correlations 816a-816d are generated. Buffers 1002 and 1006 are used to retain BB-filtered data at the ends of the cross-correlators as the BB-filtered data is shifted over some range to meet the needs of the align sync process.

Cross-Correlation Blocks

Figure 11:
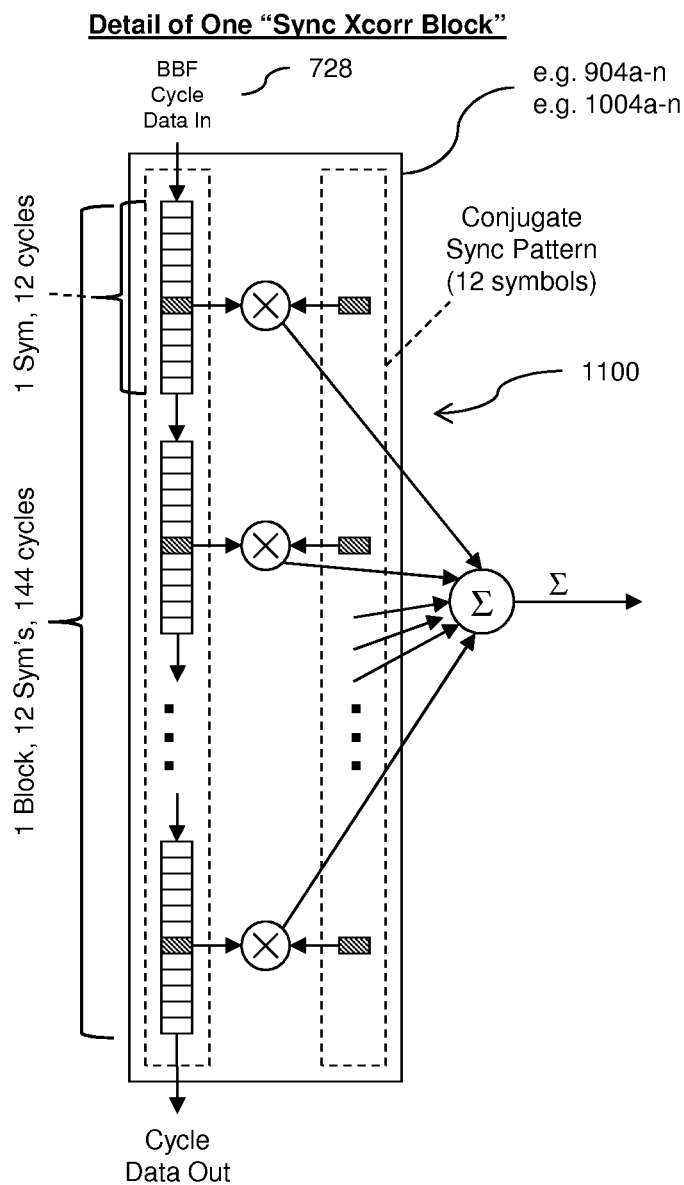
FIG. 11 shows a cross-correlation block diagram used in connection with aspects of the present invention.

FIG. 11 shows the details of an embodiment of the Sync Cross-Correlation Blocks, such as block 1004a shown in FIG. 10, as they are used in one channel of the find sync and align sync processes, to perform complex block cross-correlations between the target sync pattern and BB-filtered cycle data.

Multi-Channel Align Sync

Figure 12:
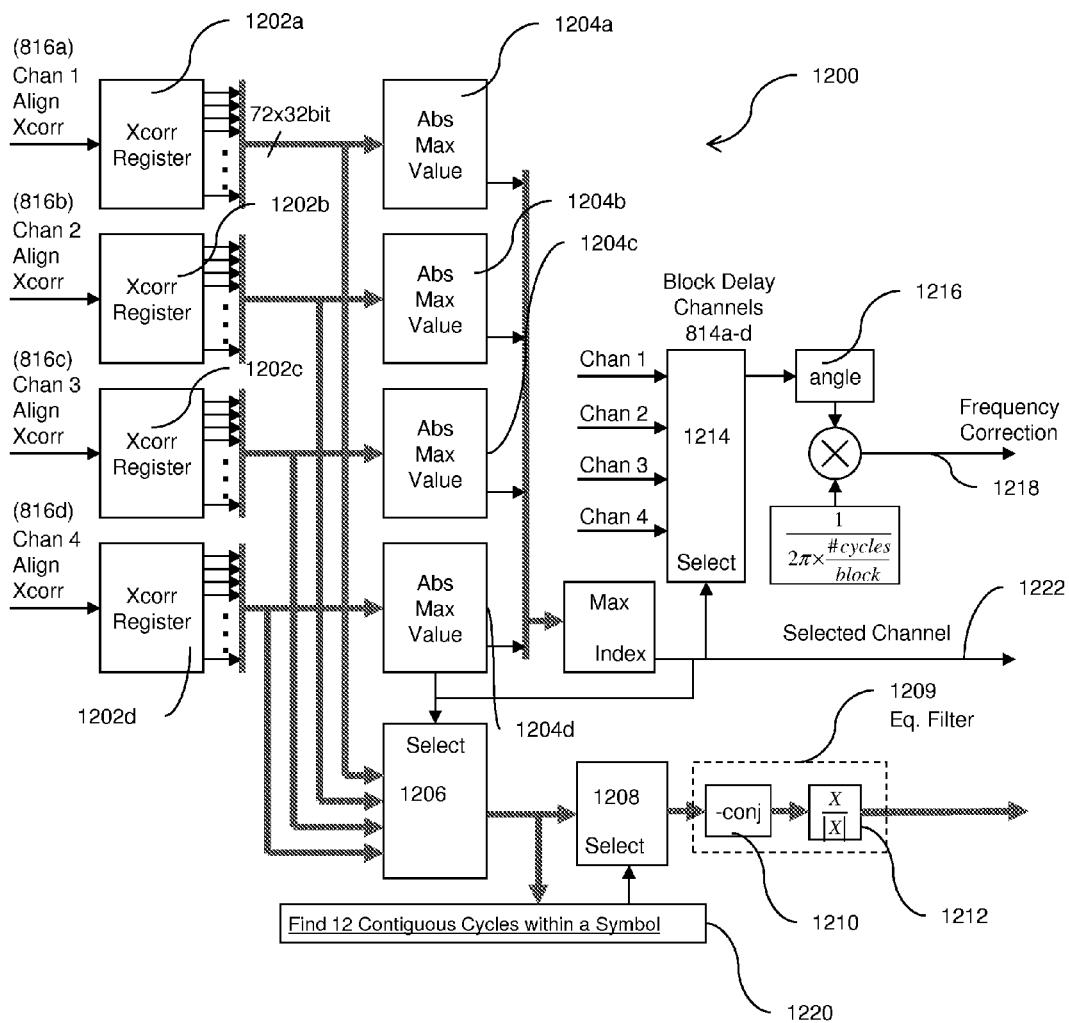
FIG. 12 shows a multi-channel align sync section block diagram used in connection with aspects of the present invention.

FIG. 12 shows the details an embodiment of the multi-channel align sync section of the receive block diagram. The multi-channel align sync process 1200 described in FIG. 12 identifies the absolute maximum value of each of the align sync cross-correlations 816a-d from each channel. In this example, the dominant channel is the one with the largest absolute maximum cross-correlation value, identified as a selected channel index 1222 after a max selection process. Another method can be used by taking the largest amplitude channel identified during the gain control process. This selected channel index is used in various selection processes for selecting the various types of data corresponding to that channel. The align sync cross-correlations 816a-816d of the four channels are each held in separate cross-correlation registers 1202a-1202d, respectively. In one embodiment these registers are 48 values in length over four channels and are processed through a function that calculates the absolute peak value of each channel at 1204a-1204d, after which the maximum of the values coming from 1204a-d is determined, resulting in 1222. A selection process 1206, such as a multiplexer switch uses the selected channel index 1222, and finds the maximum signal and passes it through a process 1220 that subsequently determines the 12 largest-magnitude contiguous values that define a particular symbol. Once this sequence is found, the indexing for these contiguous values is passed to selection process 1208, an equalization filter 1209, which takes the complex conjugates of the 12 contiguous values and normalizes them to determine the complex values of the equalization filter. This equalization filter is applied later to BB-filtered data for data recovery.

Channel block delays 814a-814d (See FIGS. 10 and 12) are passed through a selection multiplexer 1214 (using selected channel index 1222 or 740 in FIG. 7) and into a frequency correction process 1218. In one embodiment, frequency correction process 1218 takes the angle of the selected block delay in the complex plane, then multiplies that number by a constant to obtain a normalized frequency correction factor.

Phase Correction

Figure 13:
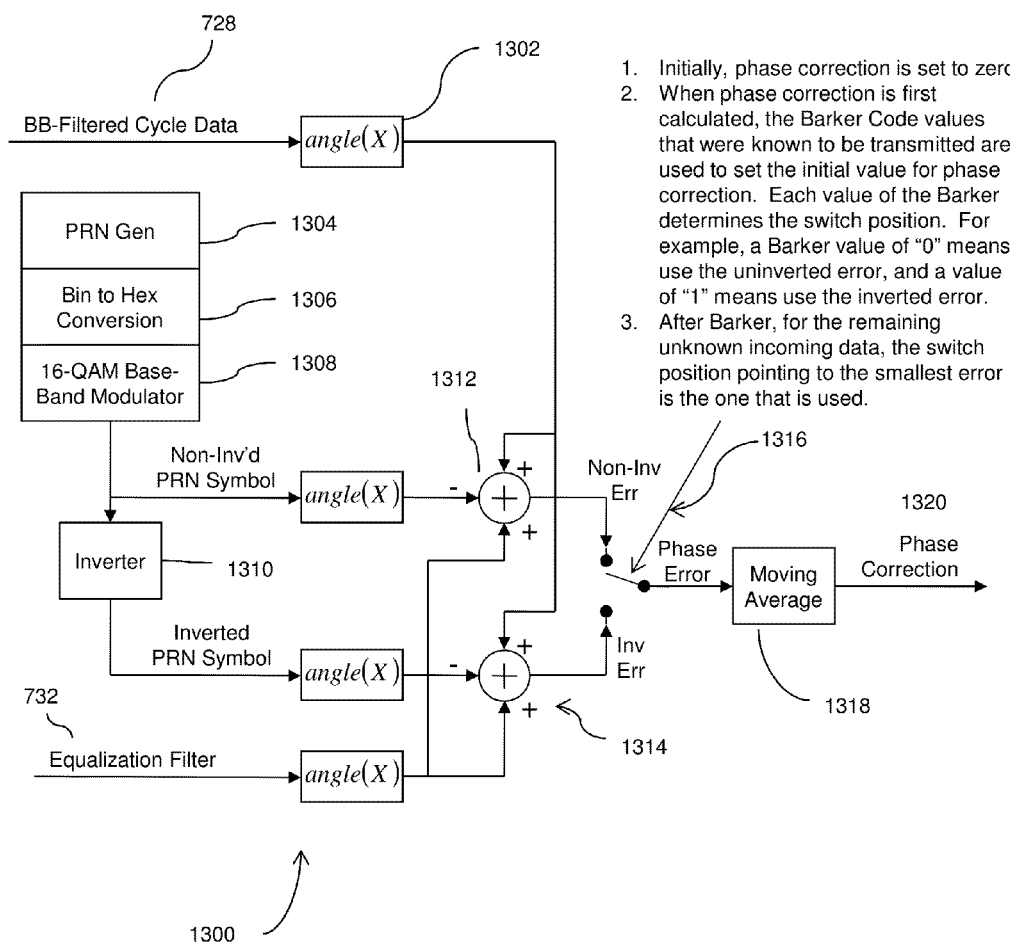
FIG. 13 shows a phase correction block diagram used in connection with aspects of the present invention.

FIG. 13 shows one embodiment of a phase correction process 1300, such as the phase correction 748 shown previously in FIG. 7. The BB-filtered cycle data 728 of the selected channel, as selected by the channel index 1222 is passed to this correction process 1300, where the phase angle is determined in the angle process 1302 by taking the four-quadrant arctangent of each value in the complex pane of BB-filtered data; this is considered the current phase angle of the incoming data. After align complete, the alignment of the incoming data relative to the target sync pattern, consisting of pseudo-random data (PRN data), that was used to generate the transmitted waveform is known, which allows the current phase angle of the incoming data to be paired with the ideal phase angle associated with the modulated PRN data. Initially, phase correction is set to zero. Directly following the sync pattern used for alignment, is a known Barker code that is not mixed with the variable user data. When phase correction is first calculated, the Barker Code values that were known to be transmitted are used to set the initial value for phase correction. Each value of the Barker determines the switch position 1316 to be selected, either the error associated with the non-inverted symbol or that of the inverted symbol. For example, a Barker value of "0" means use that the transmitted symbol was originally uninverted, therefore switch to the uninverted error. In a similar manner, a value of "1" means use the inverted error. After Barker, is the remaining unknown incoming data, where it is not known whether to use the uninverted or the inverted error; for this use the switch position pointing to the smallest error. The resulting phase error values are added to a moving average value from 1318, to generate the phase correction value 1320 that is passed to the Costas Loop of the selected channel to continue with phase-locked data recovery.

Accumulate Data

Figure 14:
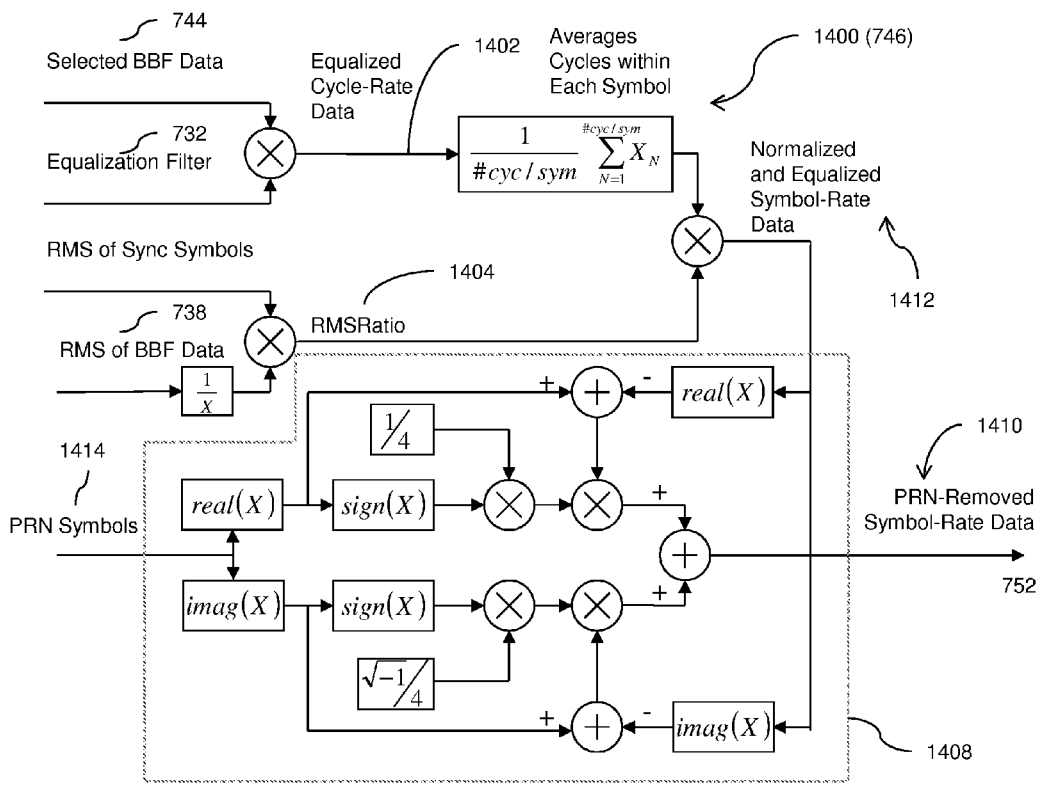
FIG. 14 shows an accumulate block diagram used in connection with aspects of the present invention.

FIG. 14 shows one embodiment of an accumulate data process 1400 such as the data accumulation process 746 shown in FIG. 7. Selected BB-filtered data 744 running at the cycle-rate is multiplied by the equalization filter 732. This multiplication involves multiplying a pair of complex numbers for every cycle over the entire symbol being evaluated to generate equalized cycle-rate data 1402. All of the equalized cycle values for an entire symbol are averaged together to generate equalized symbol-rate data, which is then normalized by the ratio of the root-mean-square of the sync symbols over a statistically large sample size divided by the root-mean-square of the BB-filtered values over a statistically large sample size, to obtain normalized and equalized symbol-rate data 1412. The data 1412 when combined with the PRN Symbols 1414 using the a combination of various functions such as multipliers and adders that are applied separately to the real and imaginary parts of each data set, as shown in the dashed region 1408, produce PRN-removed symbol-rate data 1410.

Process Data

Figure 19:
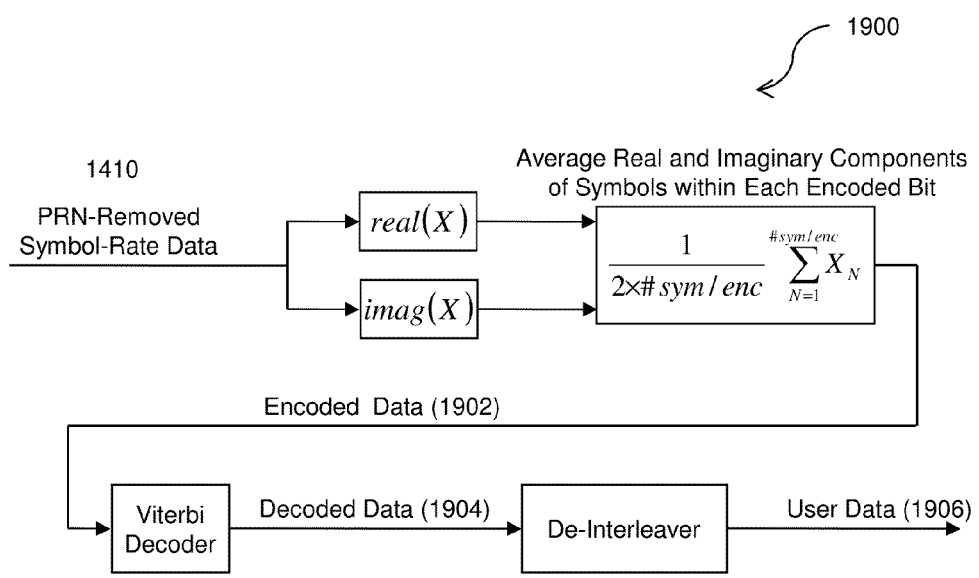
FIG. 19 shows the Process Data Section used in connection with aspects of the present invention.

In reference to FIG. 19, the process data function 1900 takes the PRN-removed symbol-rate data 1410 and reduces it to user data. First, the data 1410 is separated into real and imaginary components. Values for components for all of the values that constitute an encoded bit are averaged together to form encoded data 1902. The data is further processed using a Viterbi decoder to generate decoded data 1904. And finally, user data 1906 is recovered after a de-interleaving process.

Triangulation

Figure 16:
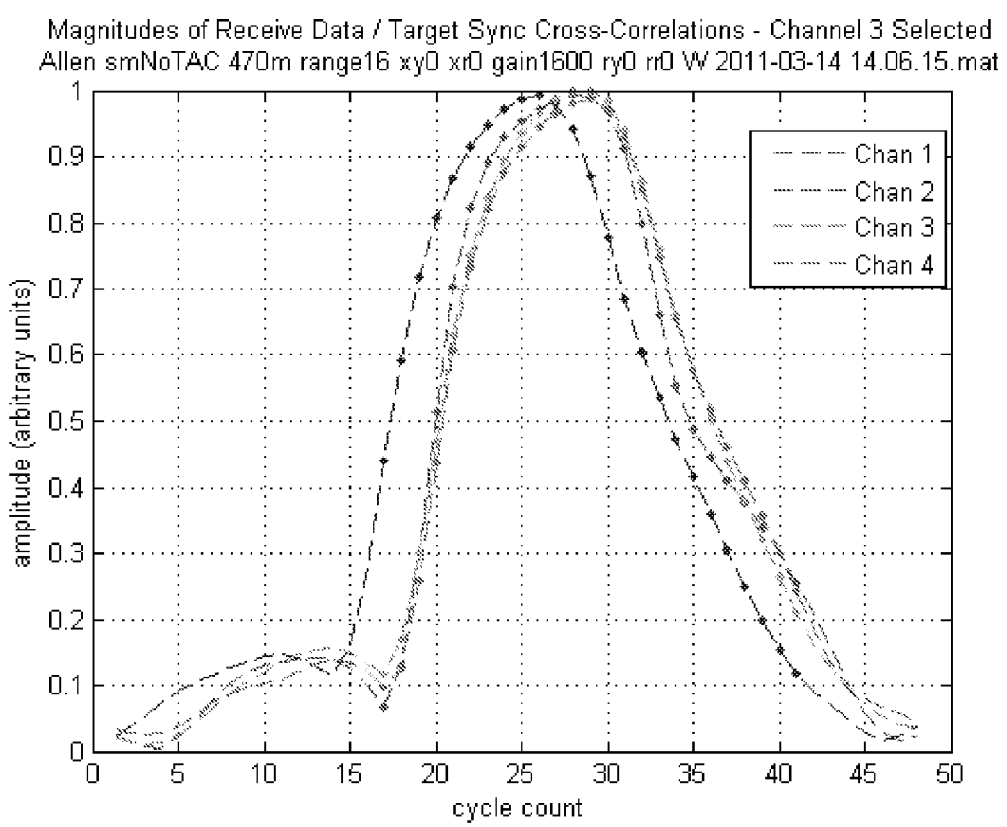
FIG. 16 shows a chart showing the magnitudes of several align sync correlations in accordance with one embodiment of the present invention.
Figure 17:
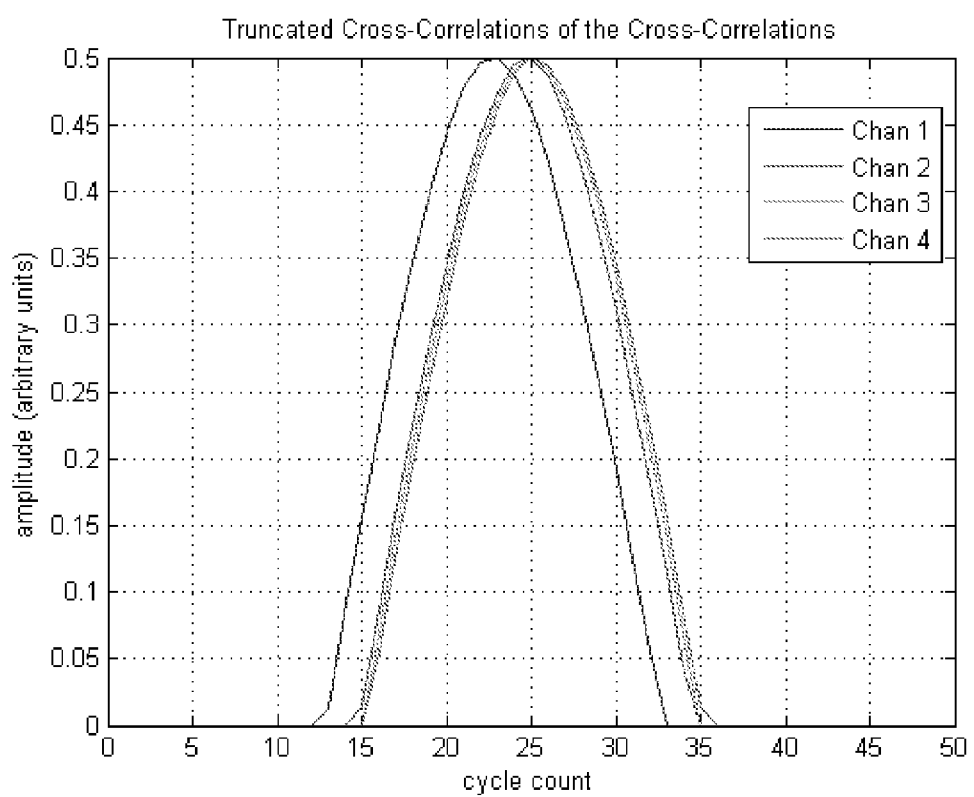
FIG. 17 shows a chart showing the cross-correlations of the magnitudes of the align sync correlations in accordance with one embodiment of the present invention.

FIG. 16 shows the align sync cross-correlated data, referenced earlier as 736 in FIG. 7. This data in its complex form was generated by the align sync process, through which the target sync pattern was cross-correlated with bb-filtered cycle data 728. The data 736 is shown here with the phase information removed, as only absolute values. Where the peaks occur in this data 736, in FIG. 16, is where bb-filtered cycle data 728 for each channel is maximally aligned with the sync pattern. Since all channel waveforms have the same reference (the same sync pattern), the time delay between these waveforms can be used through a geometric triangulation process, and by knowing the relative positions of the transducer array elements in three dimensions, and by knowing the speed of sound in the medium, a determination can be made as to the direction of the source of this transmission. However, using this align sync cross-correlated data 736 in its raw form can be subject to unnecessary errors attributed to the asymmetries and irregularities in these waveforms. Where such undesired artifacts can be attributed to the time-domain impulse response of the entire system and possibly other sources, most of which are in common to all channels, much of these common effects can be removed by performing additional cross-correlations among these four waveforms to arrive at the well-behaved waveforms shown in FIG. 17. Once this second round of cross-correlations are performed, the data is normalized and truncated below the 50% threshold to remove baseline noise and inter-symbol effects. The results are very clean cross-correlation waveforms, as shown in FIG. 17, that still have the relative time delays between the channels preserved. At this point, the relative delays can be arrived at by measuring the relative peak locations. Additional accuracy can be obtained by employing second degree polynomial fitting to accurately locate the peaks. Another method can be used by measuring the relative locations of the centroids of each waveform. Regardless of the specific means to determine the relative delays between channels, that relative delay data is applied to a geometric model of the transducer array to determine the direction to the source diver responsible for the transmission being received. The distance to the source diver is determined by measuring the round-trip time-of-flight of transmissions passed between the two divers and by knowing the propagation speed of sound in the medium.

Figure 18:
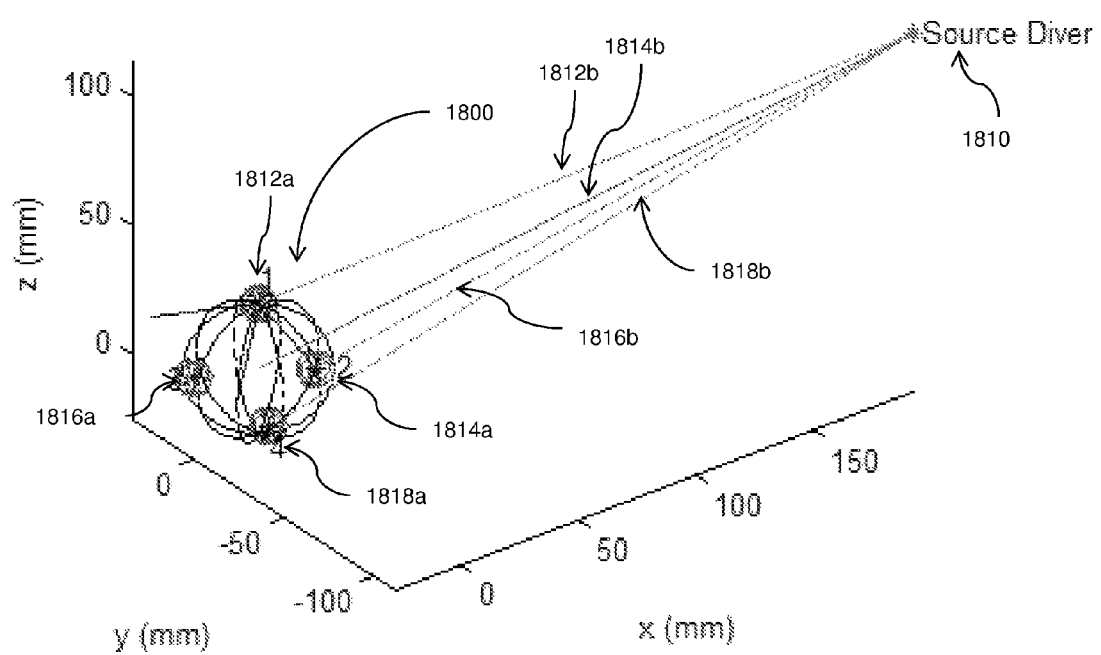
FIG. 18 is a graphic representation of a transducer array in accordance with aspects of the present invention and how a source signal is received and the several individual transducers in the array.

FIG. 18 shows an embodiment of the transducer array 1800 with 4 individual transducers 1812*a*, 1814*a*, 1816*a* and 1818*a* represented along with a point source 1810 that represents a signal originating from a transmitter located on another diver or a surface vessel. As shown by distance lines 1812*b*, 1814*b*, 1816*b* and 1818*b* the linear distance between the point source 1810 and each of the transducers is different. Using the arrival times of the signal generated by the point source 1810 at the transducers (as described above), and by measuring the round-trip time-of-flight between the two divers, the direction and distance between the transducer array 1800 and the point source 1810 can be calculated.

FIG. 19 is a process data flow chart 1900 showing the PRN-Removed Symbol Rate Data 1410 as it is processed to eventually become readable user data 1906. The PRN Removed Symbol rate data 140 is separated into its real and imaginary components and an average is taken resulting in encoded data 1902. A viterbi decoder is used to generate decoded data 1904 which is then passed to a de-interleaver before being passed to the user as user data 1906.

Embodiments of a communication system described herein may be incorporated into one of many different types of underwater dive systems that may be utilized by recreational, commercial and military industries. Aspects of a communication system constructed in accordance with the present invention may be incorporated into a handheld dive computer, underwater dive platform or directly onto the BCD (buoyancy control device) of a diver. Visual display means may also be incorporated into such a system to enable a diver to see and send messages to one or more other divers while utilizing aspects of the communication system described herein. Aspects of the communication systems described herein may be combined with other known dive computer functions such as depth, dive time, tank volume, decompression time as well as other known aspects of diving operations.

Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. An underwater communication and location device, comprising:
    an array of at least four omni-directional or isotropic ultrasonic transducers, the ultrasonic transducers positioned such that all of the transducers are not contained within a common plane;
    a transmitter adapted to,
        generate a pseudo-random code element;
        generate a data element;
        generate a modulation element;
        combine the pseudo-random code element, the data element and the modulation element into an analog waveform;

transmit the analog waveform through each of the four ultrasonic transducers.

2. The underwater communication and location device of claim 1, further comprising a receiver adapted to receive the analog waveform generated by the transmitter, determine the location of the transmitter, and interpret the data element.

3. The underwater communication and location device of claim 1, wherein the mean relative distance between each of the at least four ultrasonic transducers is between 0.5 cm and 5 10 cm.

4. The underwater communication and location device of claim 1, wherein the mean relative distance between each of the at least four ultrasonic transducers is between 10 cm and 50 cm.

5. The underwater communication and location device of claim 1, wherein the mean relative distance between each of the at least four ultrasonic transducers is between 1 cm and 100 cm.

6. The underwater communication and location device of claim 1, wherein the position of the at least four ultrasonic transducers define a generally tetrahedral shape.

7. The underwater communication and location device of claim 1, wherein the at least four ultrasonic transducer are held in their geometric orientation by an acoustically neutral material.

8. The underwater communication and location device of claim 7, wherein the acoustically neutral material is Rho-C.

9. The underwater communication and location device of claim 7, wherein the at least four ultrasonic transducers are held in position by:
a generally spherical-shaped transducer mounting surface formed from a material that approximates the acoustic properties of water.

10. The underwater communication and location device of claim 1, where:
the size and weight of said device allows for easy portability of the device by an unassisted diver.

11. The underwater communication and location device of claim 1, wherein generating a data element comprises:
interleaving text into a data stream, the data stream including burst errors, correcting the burst errors with a forward error correcting code encoder;
pre-pending barker code to the data stream;
pre-pending sync data to the data stream;
combining the data stream with the pseudo-random code element; and
translating the combined data stream into hexadecimal format.

12. The underwater communication and location device of claim 2, wherein the receiver further comprises:
a data acquisition module;
a data processing module;
a find synchronization module; and
an align synchronization module.

13. The underwater communication and location device of claim 12, wherein the receiver further comprises:
a data diagnostics module.

14. The underwater communication and location device of claim 12, wherein the find synchronization module and the align module comprise:
a data accumulator
a cross-correlator;
a channel selector;
a frequency corrector; and
an equalization filter.

15. A communication system, the system comprising:
a transmitter;
a receiver; and
a processor adapted to
receive incoming data;
generate a plurality of cross-correlation data;
pass the cross-correlation data into a block delay calculator;
calculate the average phase delay between the plurality of cross-correlation data;
generate an array of rotational vectors; and
correct for delays present in the cross-correlation data.

16. The communication system of claim 15, wherein the block delay calculator comprises one or more of a multiplier and a normalizer function.

17. The communication system of claim 15, wherein the processor is further adapted to generate a sync found signal after the delays are corrected in the cross-correlation data.

18. A communication system, the system comprising:
a transmitter;
a receiver; and
a processor adapted to,
align a target synchronization pattern with incoming data by cross-correlating segments of incoming data with corresponding segments of a target synchronization pattern to form block cross-correlation data;
pass the block cross-correlation data into a block delay compensation process wherein the block cross-correlations are corrected for time-delay differences and are combined to form a delay-compensated cross-correlation; and
use the delay-compensated cross-correlation data to locate the target synchronization data within the incoming data.

19. A communication system of claim 18, wherein the delay-compensated cross-correlation is used to:
generate an equalization filter used to recover the contents of incoming data (data element).

20. A communication system of claim 18, wherein the delay-compensated cross-correlation across a plurality of channels of incoming data is used to:
locate the source diver by a means of geometric triangulation.

21. An underwater communication system, comprising:
a plurality of location and messaging units for sending and receiving ultrasonic energy through water;
each of the location and messaging units comprising an array of four ultrasonic transducers positioned such that they define a generally tetrahedral shape;
a transceiver adapted to,
generate a code element;
generate a data element;
generate a modulation element;
combine the code element, the data element and the modulation element into an analog wave form;
transmit the analog wave form through each of the four ultrasonic transducers; and
receive the analog waveform generated by at least one of the location and messaging units.

* * * * *